(12) United States Patent
Whisenand et al.

(10) Patent No.: US 8,534,676 B2
(45) Date of Patent: Sep. 17, 2013

(54) REMOTELY CONTROLLABLE ROTARY SWITCH ACTUATOR

(76) Inventors: Jeff Whisenand, Brea, CA (US); Wayne Russell, Ontario, CA (US)

( * ) Notice: Subject to any disclaimer, the term of this patent is extended or adjusted under 35 U.S.C. 154(b) by 907 days.

(21) Appl. No.: 12/693,411

(22) Filed: Jan. 25, 2010

(65) Prior Publication Data

US 2011/0181005 A1 Jul. 28, 2011

(51) Int. Cl.
*B23B 31/18* (2006.01)
(52) U.S. Cl.
USPC ............... 279/5; 279/50; 279/134; 279/142; 74/813 C; 74/817; 70/257; 70/395; 70/456 R; 269/63
(58) Field of Classification Search
USPC ............. 279/5, 35, 37, 50, 107, 134, 142; 74/817, 813 C, 813 R, 816; 70/456 R, 252; 70/256, 257, 395, 408; 269/63
IPC ........................................................ B23B 31/18
See application file for complete search history.

(56) References Cited

U.S. PATENT DOCUMENTS

| | | | | |
|---|---|---|---|---|
| 144,123 A * | 10/1873 | Newton | ............................ | 279/37 |
| 2,448,817 A * | 9/1948 | McArthur | ...................... | 403/321 |
| 2,555,836 A * | 6/1951 | Werich | .............................. | 81/128 |
| 2,591,618 A * | 4/1952 | Schaeffer | .................... | 290/37 A |
| 2,614,781 A * | 10/1952 | Engel | ............................. | 248/502 |
| 2,942,897 A * | 6/1960 | Eason | ............................. | 403/317 |
| 3,024,051 A * | 3/1962 | Hullinger | ...................... | 403/327 |
| 3,507,259 A * | 4/1970 | Lankford | ..................... | 123/179.2 |
| 3,863,753 A * | 2/1975 | Shank, Jr. | ..................... | 198/680 |
| 3,938,613 A * | 2/1976 | Raborn | ......................... | 180/272 |
| 4,008,900 A * | 2/1977 | Khoshaba | ......................... | 279/5 |
| 4,032,163 A * | 6/1977 | Holt | .................................. | 279/37 |
| 4,036,040 A * | 7/1977 | Graizzaffi | ........................ | 70/431 |
| 4,071,174 A * | 1/1978 | Weiner | .......................... | 224/277 |
| 4,110,629 A * | 8/1978 | Dotson et al. | ................ | 290/38 R |
| 4,117,678 A * | 10/1978 | Turner et al. | .................... | 60/369 |
| 4,910,983 A * | 3/1990 | Taylor | ........................... | 70/456 R |
| 5,457,868 A * | 10/1995 | Blaimschein | ................... | 29/559 |
| 6,396,388 B1 * | 5/2002 | Dong | ............................ | 340/5.62 |
| 6,502,835 B1 * | 1/2003 | Tiede | ................................ | 279/5 |
| 6,701,760 B1 * | 3/2004 | Elliason | ........................... | 70/256 |
| 6,746,035 B1 * | 6/2004 | Williams et al. | .............. | 280/432 |
| 2008/0066225 A1* | 3/2008 | Feener | ............................ | 4/572.1 |

FOREIGN PATENT DOCUMENTS

DE 4105113 C1 * 8/1992

* cited by examiner

*Primary Examiner* — Eric A Gates

(57) ABSTRACT

A rotary actuator comprises a rotatable chuck assembly and an actuating mechanism. The chuck assembly may include a chuck housing movable between retracted and deployed positions. The chuck assembly may further include a pair of jaws pivotable between open and closed positions in correspondence to the retracted and deployed positions of the chuck housing. The actuating mechanism may be coupled to the chuck assembly for rotation between "Off", "Neutral", and/or "On" positions.

19 Claims, 8 Drawing Sheets

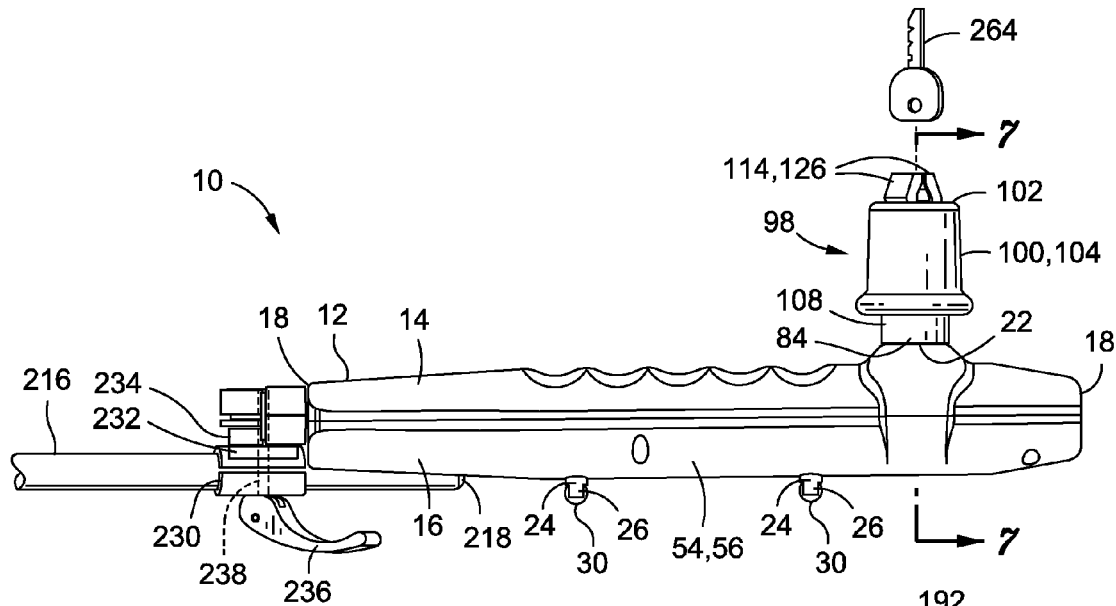
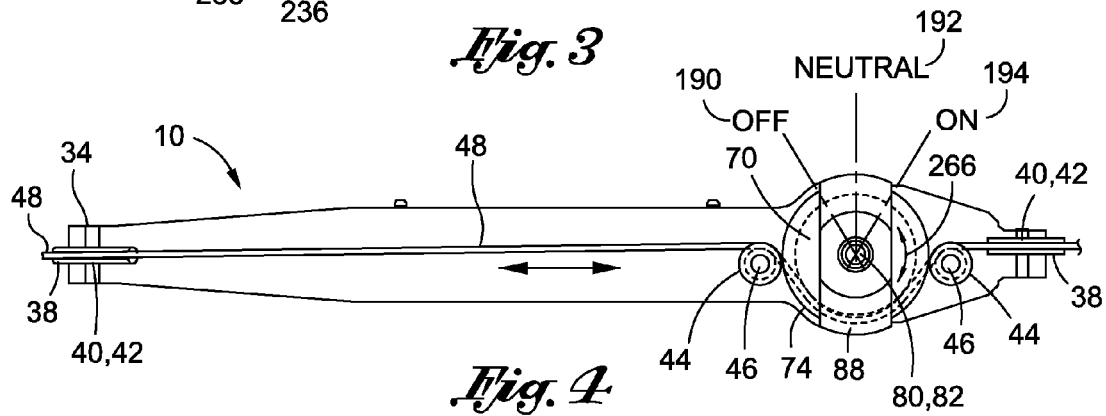
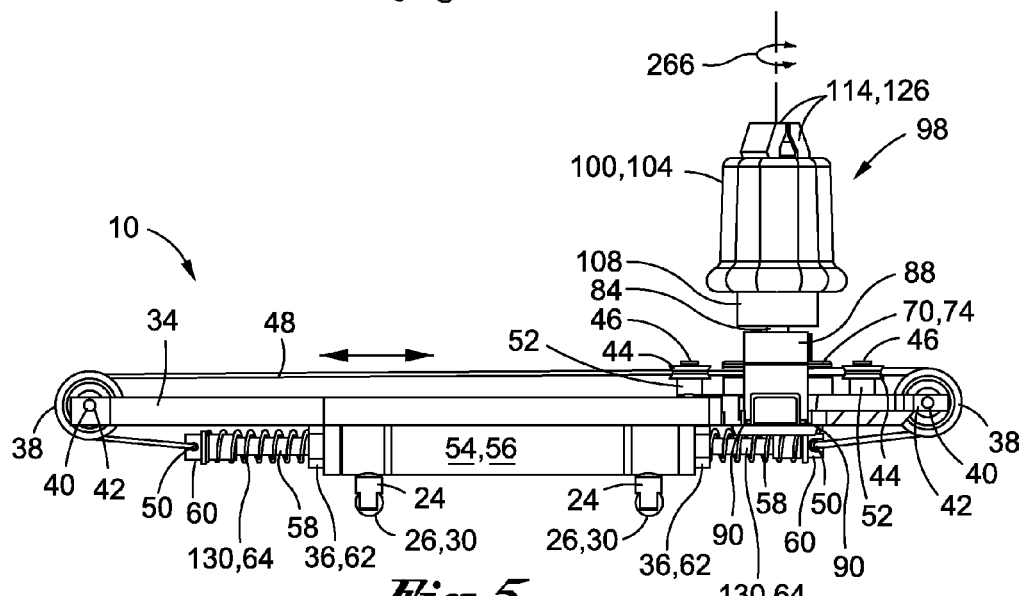

REMOTELY CONTROLLABLE ROTARY SWITCH ACTUATOR

CROSS-REFERENCE TO RELATED APPLICATIONS (Not Applicable)

STATEMENT RE: FEDERALLY SPONSORED RESEARCH/DEVELOPMENT (Not Applicable)

FIELD

The present disclosure relates generally to automotive diagnostic equipment and, more particularly, to equipment for remotely actuating a rotary switch such as an ignition switch of a motor vehicle.

BACKGROUND

When servicing motor vehicles, it is occasionally necessary to actuate the ignition switch in order to diagnose certain issues with the motor vehicle such as issues with the electrical system. In this regard, it may be necessary to rotate the ignition switch of the motor vehicle between the "Off" position, "On" position and "Start" position. Conventional ignition switches of motor vehicles are typically configured to accept an ignition key which is receivable within the ignition switch to allow for rotation of the ignition switch to one of the above-mentioned positions.

When the ignition switch is in the "On" position, certain electrical systems of the motor vehicle may be activated. For example, indicator lights on the dashboard may be illuminated and computer systems and other electrical systems may be activated with the ignition switch in the "On" position. Furthermore, the electrical system for starting the engine may be energized when the ignition switch is moved to the "On" position.

When the ignition switch is rotated to the "Start" position, power from the battery of the motor vehicle is typically delivered to a starter solenoid which causes the starter to rotate the engine while electricity from the alternator and battery is provided to the spark plugs of the engine. An engine that is operating properly will typically start within a few seconds of the ignition switch being rotated to the "Start" position after which the ignition switch may be released. The ignition switch is typically spring-loaded such that when released, the ignition switch automatically rotates back toward the "On" position.

When diagnosing a problem with a motor vehicle, it may be necessary for a technician to be physically located at the engine compartment and away from the ignition switch so that the technician may observe the operation or state of the various components in the engine compartment while the ignition switch is rotated between the "Off", "On" and "Start" positions. Although an assistant may be helpful in manipulating the ignition switch to the different positions while the technician diagnoses problems in the engine compartment, an assistant may not always be available. Furthermore, the use of an assistant for rotating the ignition switch may be an inefficient use of manpower.

As can be seen, there exists a need in the art for a device that allows for remote actuation of a rotary switch such as an ignition switch of a motor vehicle in a manner that obviates the need for an assistant. Furthermore, there exists a need in the art for a system and method for remote actuation of a rotary switch which is simple in construction, low in cost and convenient to operate.

SUMMARY

The above-noted needs associated with actuation of an ignition switch for diagnostic testing are specifically addressed by the present disclosure which provides a rotary actuator which facilitates remote activation of a rotary switch. In the context of a motor vehicle, the rotary actuator may provide a means for activating and de-activating the electrical systems of the motor vehicle and/or starting and stopping the engine of the motor vehicle from a remote location. However, the rotary actuator is not limited to the automotive industry but may be implemented for use in any application or industry requiring remote actuation of a rotary switch.

In an embodiment, the rotary actuator may include a rotatable chuck assembly which may be clamped to an ignition key of a motor vehicle. The chuck assembly may be configured to rotate in a manner that is complementary to the rotation of an ignition switch of the motor vehicle. The rotatable chuck assembly may be operatively coupled to an actuating mechanism such as, without limitation, an air cylinder for rotating the chuck assembly to one of an "Off" position, a "Neutral" position and an "On" position. However, the actuating mechanism is not limited to an air cylinder configuration but may be provided in any suitable configuration including, but not limited to, a hydraulic actuator and/or an electromechanical actuator.

The rotary actuator may be mounted to a stationary feature such as to a hard point of the motor vehicle. For example, the rotary actuator may be mounted to an item having a relatively large mass which may be positioned on a seat of the motor vehicle and to which the rotary actuator may be clamped while the chuck assembly is engaged to the ignition switch of the motor vehicle. In another example, the rotary actuator may be clamped to a fixed point of the motor vehicle such as a center console, a dashboard, a windshield or any other stationary feature.

The rotary actuator may include a chuck biasing mechanism to bias the chuck assembly away from the "On" position and toward the "Neutral" position. The rotary actuator may further include a control switch for controlling the actuating mechanism (e.g., air cylinder) in order to control the rotation of the chuck assembly. For example, the control switch may be coupled to an air source by means of one or more air cylinder hoses for providing pressurized air to the air cylinder. The control switch may include a valve which may be regulated by means of a rocker-type switch element for routing pressurized air from the air source through a pair of the air cylinder hoses that may be fluidly connected to opposing ends of the air cylinder.

By toggling the switch element from the "Neutral" position to the "Off" position, the air cylinder may be moved in a linear direction causing corresponding rotational movement of the chuck assembly such as toward the "Off" position. Likewise, toggling the switch element from the "Neutral" position to the "On" position may route pressurized air to the opposite end of the air cylinder causing movement of the air cylinder in an opposite linear direction and rotation of the chuck assembly in the opposite rotational direction such as toward the "On" position.

The chuck assembly may be engaged to any one of a variety of objects such as a key for the ignition switch of a motor vehicle. The chuck assembly may include a chuck housing having an opening from which a pair of jaws may extend. The jaws may be pivotably mounted to a chuck body housed within the chuck housing. The chuck body may be engaged to a main shaft coupled to the air cylinder for rotating the chuck body. The jaws may be pivotable between open and closed positions in correspondence with axial movement of the chuck housing between deployed and retracted positions.

A jaw spring (e.g., compression spring) may be interposed between the jaws to urge or bias the jaws toward the open position. Axial movement of a chuck housing from the deployed position to the retracted position may allow the jaws to pivot away from one another toward the open position under the biasing force of the jaw spring. An ignition key may be inserted into the gap between the open jaws. Movement of the chuck housing back toward the deployed position under the urging of a chuck spring may force the jaws back toward the closed position causing the keys to be clamped between the jaws.

With the chuck assembly clamped to the key and with the key inserted into the ignition switch, a technician at a remote location may rotate the ignition switch by manipulating the switch element of the control switch. The control switch may include a switch cover pivotally mounted to the control switch housing. The switch cover may be configured to move the switch element to the "Off" position when the switch cover is fully depressed into the closed position. In this regard, the switch cover may provide a safety feature to allow rapid toggling of the switch element to the "Off" position thereby shutting off the ignition of the motor vehicle.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 3 is a side view of the rotary actuator illustrating the actuating mechanism coupled to the chuck assembly;

FIG. 4 is a top view of the rotary actuator wherein a main housing of the rotary actuator is removed to illustrate a cable operably coupled to a main hub for rotating the chuck assembly;

FIG. 5 is a side view of an embodiment of the actuating mechanism comprising an air cylinder for rotating the chuck assembly by means of the cable;

DETAILED DESCRIPTION

Figure 1:
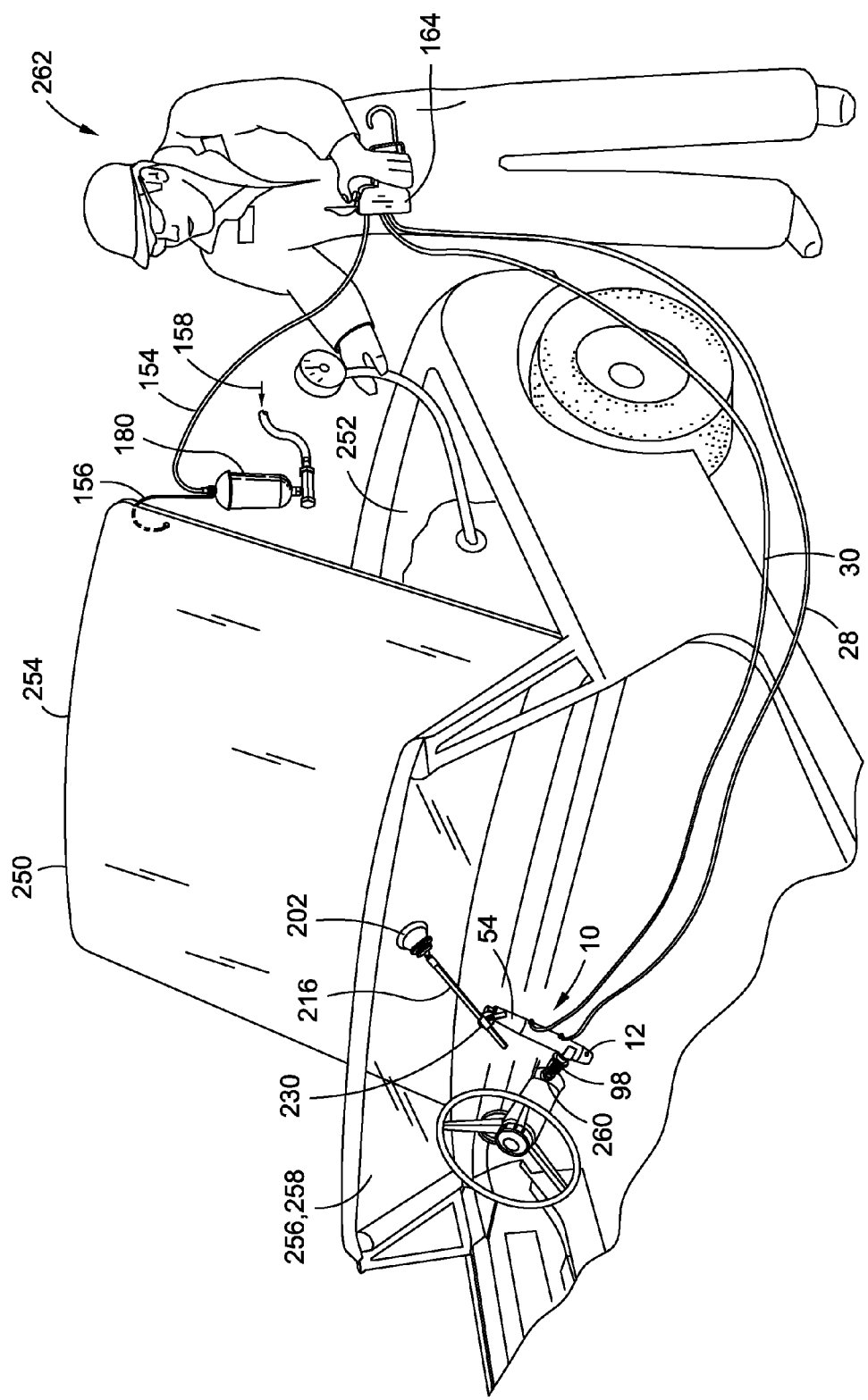
FIG. 1 is a perspective illustration of an embodiment of a remotely operable rotary actuator mounted to a motor vehicle and engaged to an ignition switch thereof.

Referring now to the drawings wherein the showings are for purposes of illustrating preferred and various embodiments of the disclosure only and not for purposes of limiting the same, shown in FIG. 1 is a perspective illustration of an embodiment of a rotary actuator 10 which may be remotely operated such as by a technician 262 during diagnostic testing of a motor vehicle 250. Although illustrated in the context of a motor vehicle, the rotary actuator 10 may be implemented in any one of a variety of applications wherein rotation of a rotary switch is desired. Furthermore, the rotary actuator 10 as disclosed herein may be implemented in any one of a variety of industries including the aerospace and marine industries or any other industry where actuation of a rotary switch by remote control is desired. In this regard, the rotary actuator 10 may be implemented in any application, without limitation, requiring rotation of a rotary switch or other rotating device between two or more positions.

As shown in FIG. 1, the rotary actuator 10 may be implemented during diagnostic testing of the motor vehicle 250 wherein a technician 262 may control operation of the rotary actuator 10 by means of a control switch 164. The control switch 164 may be communicatively coupled to an air cylinder 56 which may be mechanically coupled to a chuck assembly 98 of the rotary actuator 10. As can be seen in FIG. 1, the rotary actuator 10 may be mountable to a stationary feature 268 such as the windshield 256 of the motor vehicle 250 or any other suitable feature. The rotary actuator 10 may include a universal joint 230 to provide for adjustability of the rotary actuator 10 to fit a given application. For example, the rotary actuator 10 may include a swivel rod 216 extending from a clamp mechanism 200 that may be clamped to a stationary feature 268. The universal joint 230 may be slidable along a length of the swivel rod 216 and may be clamped at any location therealong. The universal joint 230 may facilitate angular adjustment of the orientation of the rotary actuator 10 relative to the swivel rod 216. The orientation of the rotary actuator 10 relative to the swivel rod 216 may be locked into position by means of a cam lever 236 of the universal joint 230 as will be described in greater detail below.

Referring still to FIG. 1, the rotary actuator 10 may include the clamp mechanism 200 which, in an embodiment, may be configured as a suction cup 202 for clamping to a smooth surface such as a windshield 256. The clamp mechanism 200 may include a swivel ball 214 to provide substantially 360° freedom-of-movement of the swivel rod 216 relative to the clamp mechanism 200. The rotary actuator 10 may include the actuating mechanism 54 such as the air cylinder 56 which may be coupled to the chuck assembly 98. The chuck assembly 98 may be clamped to a key 264 of the motor vehicle 250 for receipt into the ignition switch 260. The air cylinder 56 facilitates rotation of the chuck assembly 98 in a clockwise and/or counterclockwise direction in order to rotate the ignition switch 260 between an "Off" position 190, a "Neutral"

position 192 or an "On" position 194. In this manner, the rotary actuator 10 may facilitate remote starting and stopping of the engine of the motor vehicle 250 and/or remote activation of the electrical system of the motor vehicle 250.

Referring still to FIG. 1, shown is the rotary actuator 10 mounted to the motor vehicle 250 and illustrating a technician 262 standing near an engine compartment 252 and holding the control switch 164 in order to regulate the rotary actuator 10. In the embodiment shown, the rotary actuator 10 may include an air cylinder 56 as the actuating mechanism 54. However, the actuating mechanism 54 may be configured in any one of a variety of different embodiments including, but not limited to, electromechanical and/or hydraulic embodiments or any other suitable actuating means for rotating the chuck assembly 98.

In FIG. 1, the rotary actuator 10 may include an air reservoir 140 which may be coupled to an air source 158 (e.g., shop air) for providing pressurized air or gas to the air reservoir 140. The air reservoir 140 may include a reservoir hook 156 or other attachment means for removably mounting the air reservoir 140. For example, the air reservoir 140 is illustrated in FIG. 1 as being hung from a hood 254 of the motor vehicle 250. The air reservoir 140 may be coupled to the control switch 164 by means of a reservoir hose 154 for providing pressurized air to the control switch 164. The control switch 164 may be coupled to the actuating mechanism 54 by a pair of air cylinder hoses 30 for providing pressurized air to the air cylinder 56.

Figure 6:
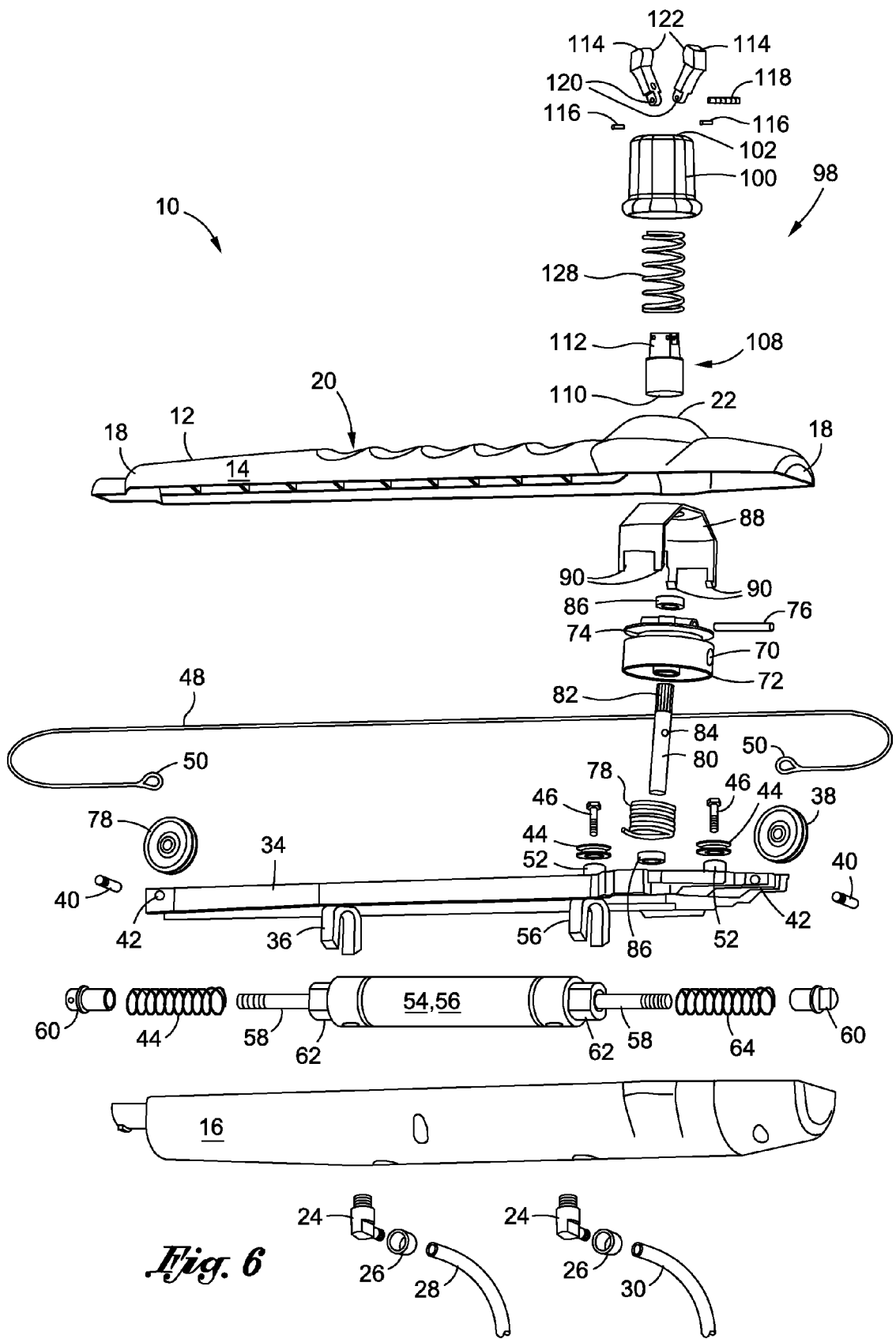
FIG. 6 is an exploded illustration of the actuating mechanism and the chuck assembly.

Referring still to FIG. 1, the pair of air cylinder hoses 30 may extend from the control switch 164 to the actuating mechanism 54. By toggling a switch element 188 of the control switch 164, the technician 262 may direct pressurized air into one of opposing ends of the air cylinder 56 in order to actuate the air cylinder 56 into one of opposing directions. The air cylinder 56 is, in turn, coupled to the chuck assembly 98 such as by means of a cable 48. The cable 48 may be attached to a rotatable main hub 70 as best seen in FIG. 6 in order to convert linear motion of the cable 48 into rotary motion of the chuck assembly 98 as described in greater detail below.

Figure 2:
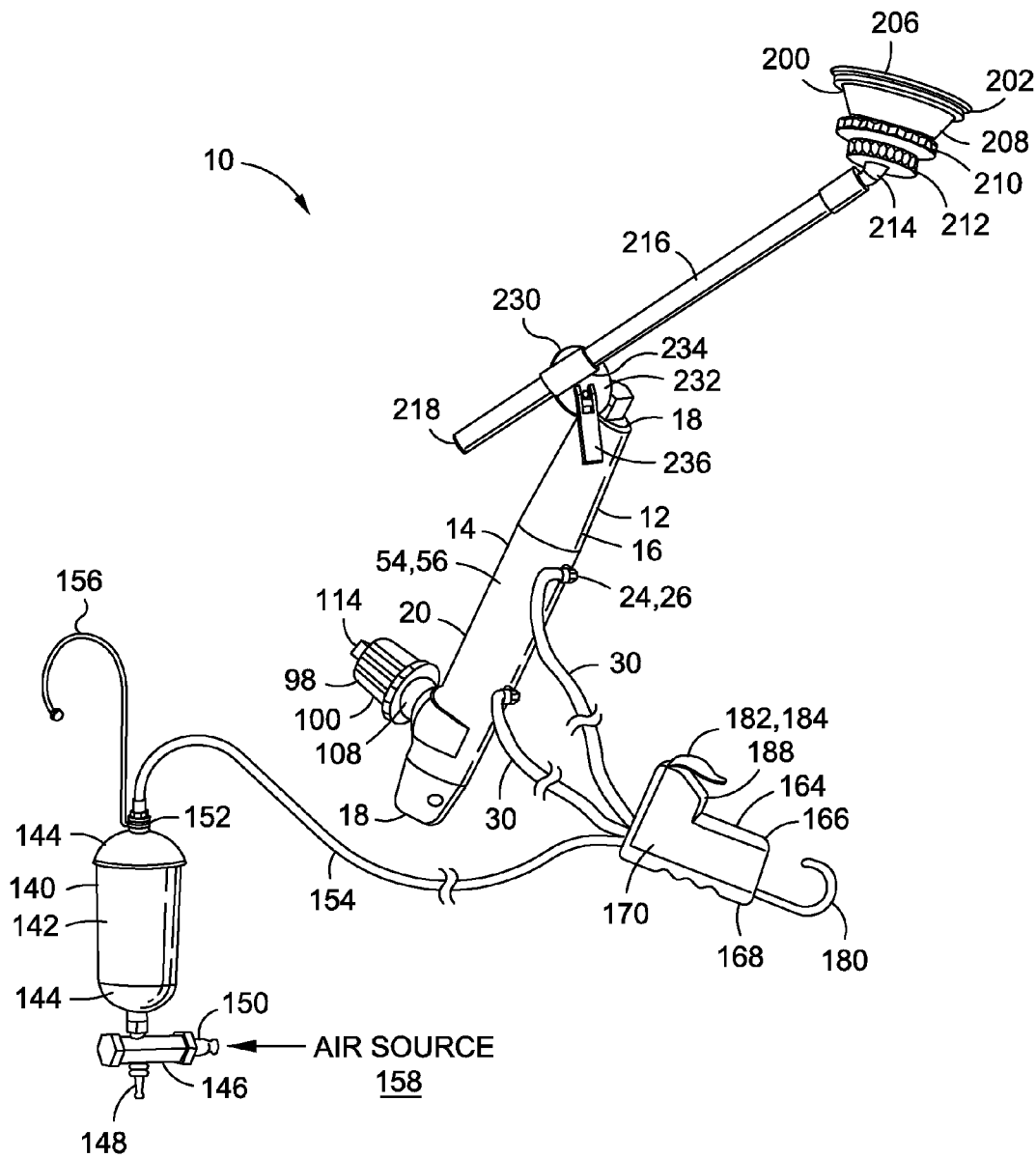
FIG. 2 is a perspective illustration of the rotary actuator including a rotatable chuck assembly coupled to an actuating mechanism which, in turn, may be coupled to a control switch.

Referring to FIG. 2, shown is an exploded perspective illustration of the rotary actuator 10 comprising the clamp mechanism 202 for supporting actuating mechanism 54. The actuating mechanism 54 may be coupled to the chuck assembly 98 and may further include the control switch 164 and air reservoir 140 communicatively coupled to the actuating mechanism 54. As can be seen in FIG. 2, the clamp mechanism 200 may be coupled to the actuating mechanism 54 such as by means of a universal joint 230. The universal joint 230 may be mounted between an end of the main housing 12 of the actuating mechanism 54 and a swivel rod 216 extending from the clamp mechanism 200.

The clamp mechanism 200 may comprise any suitable configuration for mounting the rotary actuator 10 to a fixed location such as a stationary feature 268 on a motor vehicle 250. In the embodiment illustrated in FIG. 2, the clamp mechanism 200 may include the suction cup 202 having a faying surface 220 for mounting to a fixed attach surface such as a windshield 256 of the motor vehicle 250 as illustrated in FIG. 1. However, the clamp mechanism 200 may be provided in any configuration and is not limited to a suction cup 202 device.

For example, the clamp mechanism 200 may be configured as a mechanical bracket (not shown) for attachment to a stationary feature. Furthermore, the clamp mechanism 200 may comprise a mechanical clamp for clamping to a center console of the motor vehicle, to a dashboard, or to any other feature. In addition, the clamp mechanism 200 may be configured to clamp to a movable object of relatively large mass. The large mass may be positioned on a seat of the motor vehicle 250 and the clamp mechanism 200 may be clamped to the object of relatively large mass. Alternatively, the clamp mechanism 200 may be clamped to a tripod or other similar feature mounted on a floor of the motor vehicle 250 or other stationary feature.

Figure 2C:
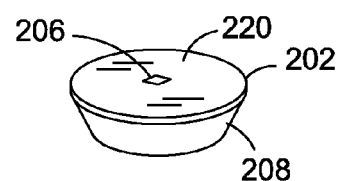
FIG. 2C is a perspective illustration of a faying surface of a suction cup wherein the faying surface includes a suction release nub.
Figure 2A:
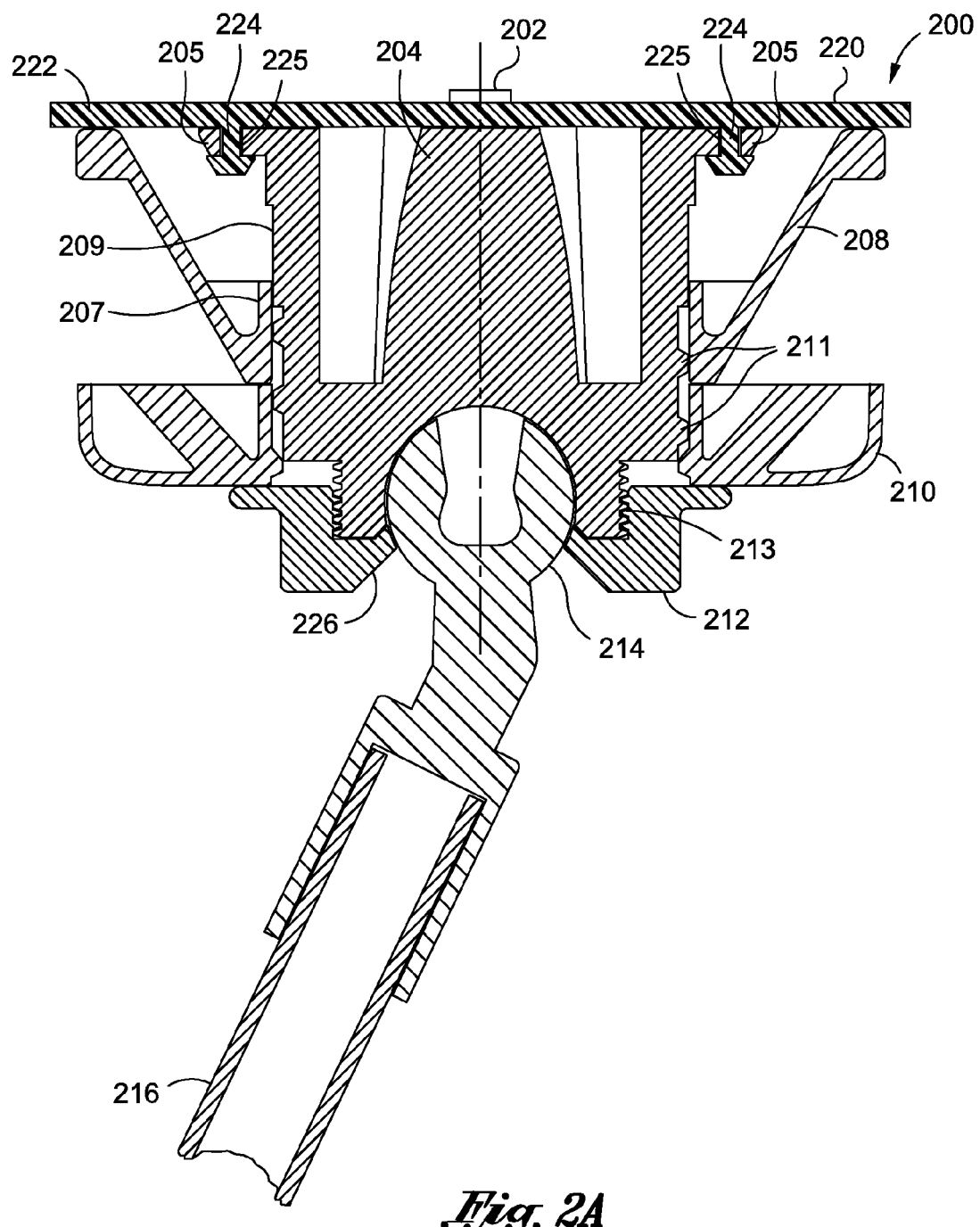
FIG. 2A is a sectional illustration of an embodiment of the clamp mechanism coupled to a swivel ball and a swivel rod which may extend outwardly from the clamp mechanism toward the actuating mechanism.
Figure 2B:
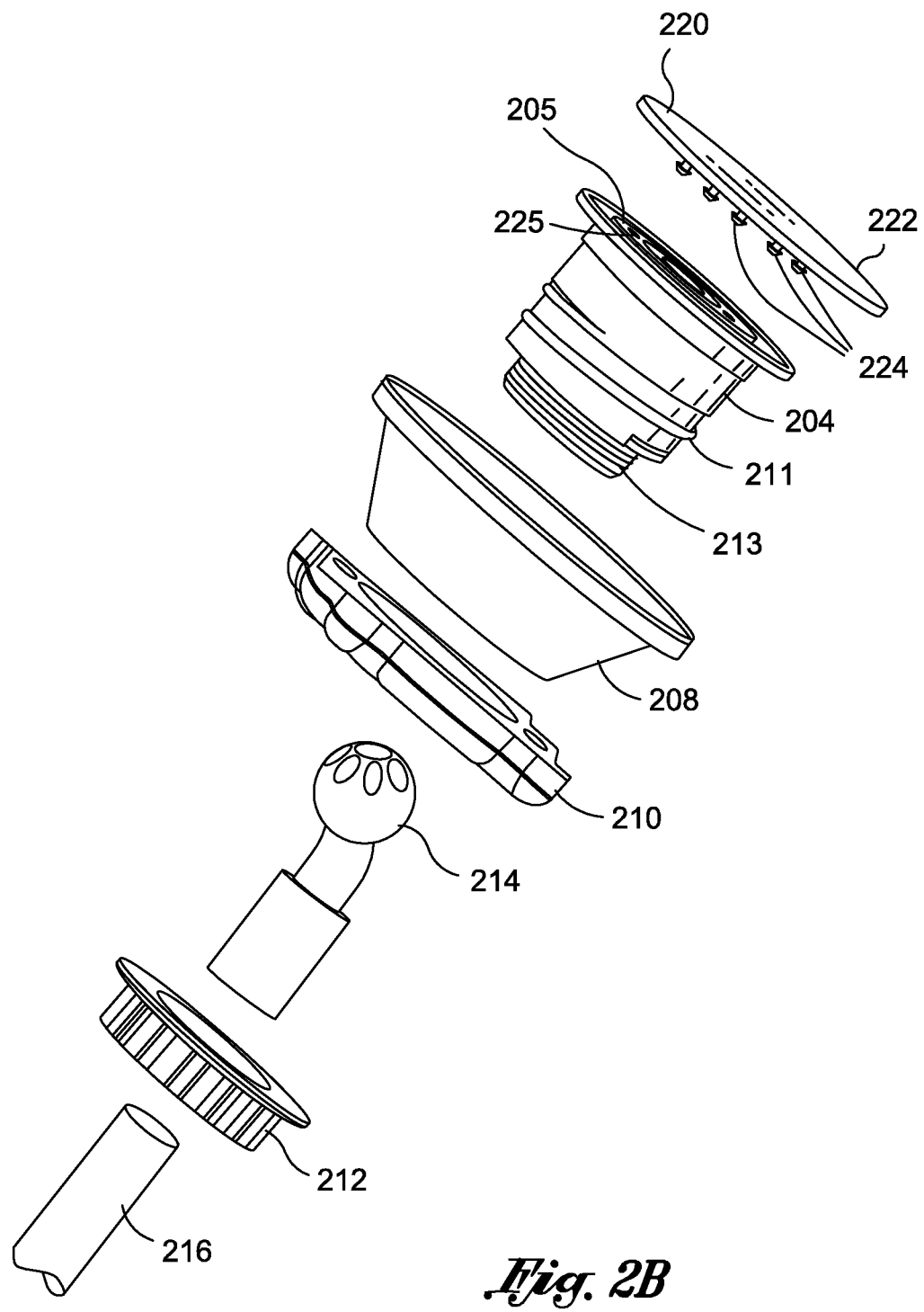
FIG. 2B is an exploded perspective illustration of the clamp mechanism illustrated in FIG. 2A.

In an embodiment shown in FIGS. 2, 2A, 2B and 2C, the clamp mechanism 200 may comprise the suction cup 202 for engaging a mounting surface 258. As best seen in FIGS. 2A-2B, the suction cup 202 may include an elastic cup sheet 222 which may be formed of a resiliently flexible material such as polymeric material (e.g., rubber) for suctionally engaging the mounting surface 258. The suction cup 202 may include a cup support 208 which may extend between the cup sheet 222 and a cup body 204. Although illustrated as being conically shaped, the cup support 208 may be provided in any size, shape or configuration. The cup support 208 may include an inner sleeve 207 which may be axially slidably mounted on a support shaft 209 of the cup body 204. A cup adjustment nut 210 as shown in FIG. 2A may be threadably mounted to the cup body 204.

As shown in FIGS. 2A-2B, the cup sheet 222 may be fixedly coupled to the cup body 204 of the suction cup 202 by means of one or more inserts 224 that may be integrally molded with or otherwise mounted to the cup sheet 222. The inserts 224 may extend inwardly from the cup sheet 222 into the suction cup 202 and may be received within a corresponding quantity of bores 225 formed in a cup body flange 205 of the cup body 204. However, the cup sheet 222 may be fixedly coupled to the cup body 204 by any suitable mechanism and is not limited to the insert 224 and bore 225 arrangement shown in FIG. 2A.

Referring still to FIGS. 2A-2B, the cup adjustment nut 210 may be threadably engaged to the cup support 208 by means of adjustment threads 211 which may be formed on the cup body 204. Rotation of the cup adjustment nut 210 in one direction may facilitate the generation of a vacuum force between the cup sheet 222 and the mounting surface 258 by drawing the cup sheet 222 inwardly into the cup body 204 while the perimeter edge of the cup sheet 222 is maintained against the mounting surface 258 by the outer edge of the cup support 208 which bears against the cup sheet 222. The cup adjustment nut 210 may be rotated until sufficient vacuum pressure is generated between the faying surface 220 of the cup sheet 222 and the mounting surface 258 to hold the suction cup 202 to the mounting surface 258. Rotation of the cup adjustment nut 210 in one direction facilitates the application of vacuum pressure between the faying surface 220 of the cup sheet 222 and the mounting surface 258. Rotation of the cup adjustment nut 210 in an opposite direction facilitates release of the vacuum pressure between the faying surface 220 and the mounting surface 258 for removal of the suction cup 202.

Referring briefly to FIG. 2C, shown is a perspective illustration of the suction cup 202 illustrating the faying surface 220 which may include a suction release nub 206 mounted thereto. The release nub 206 may be optionally included on the cup sheet 222 to facilitate release of vacuum pressure between the cup sheet 222 and the mounting surface 258 for removal of the suction cup 202. Although illustrated as being mounted in a generally central location on the cup sheet 222, the release nub 206 may be mounted at any location on the cup sheet 222. Furthermore, although a single one of the release nubs 206 is illustrated as being mounted on the cup sheet 222, any number may be provided.

Referring to FIG. 2A, the clamp mechanism 200 may further include a swivel lock nut 212 and a swivel ball 214 receivable within the cup body 204. The swivel lock nut 212 may be threadably engaged to the cup body 204 by means of lock threads 213. The swivel lock nut 212 may include an annular flange 226 which may be sized and configured to be clamped to the swivel ball 214 when the swivel lock nut 212 is rotated. In this manner, the swivel lock nut 212 facilitates adjustment of the angular orientation of the suction cup 202 relative to the swivel rod 216 which extends outwardly from the suction cup 202. For example, the suction cup 202 may be fixed in any desired orientation relative to the swivel rod 216 after which the swivel lock nut 212 may be rotated and tightened to fix the orientation of the swivel rod 216 relative to the suction cup 202 or alternative configuration of the clamp mechanism 200.

Referring to FIG. 2, the swivel rod 216 extends outwardly from the clamp mechanism 200. The universal joint 230 may be slidable along a length of the swivel rod 216 and may be clamped at any location along the swivel rod 216 in order to fix the relative position of the rotary actuator 10. The universal joint 230 may comprise a first swivel clamp portion 232 which may be mounted on an end of a main housing 12 of the actuating mechanism 54. The universal joint 230 may further include a second swivel clamp portion 234 which may be engageble to the first swivel clamp portion 232 by means of a cam lever 236. The cam lever 236 may be engaged to a clamp stud 238 extending through the first and second swivel clamp portions 232, 234. The universal joint 230 may be selectively positioned at any location along a length of the swivel rod 216 and may be locked into place by rotating the cam lever 236 in order to clamp the first swivel clamp portion 232 to the second swivel clamp portion 234.

The second swivel clamp portion 234 may include a cylindrical sleeve sized complementary to an outer diameter of the swivel rod 216 such that clamping of the cam lever 236 facilitates clamping of the second swivel clamp portion 234 to the swivel rod 216. Likewise, the first swivel clamp portion 232 may be coupled to an end of the main housing 12 of the actuating mechanism 54. The first swivel clamp portion 232 may be pivotable relative to the end of the main housing 12 in order to facilitate adjustment of the orientation of the actuating mechanism 54 relative to the swivel rod 216. By clamping the cam lever 236 into the locked position, the orientation of the first swivel clamp portion 232 may be fixed relative to the end of the main housing 12. In this manner, the cam lever 236 facilitates the locking into position of the first and second swivel clamp portions 232, 234 relative to one another as well as locking the first and second swivel clamp portions 232, 234 into position relative to the swivel rod 216 and the main housing 12.

Referring still to FIG. 2, shown is an air reservoir 140 which may be optionally included with the rotary actuator 10. The air reservoir 140 may be formed as a reservoir body 142 having opposing reservoir caps 144 on opposing ends of the reservoir body 142. Although shown as having a generally cylindrical shape, the air reservoir 140 may be provided in any suitable size, shape and/or configuration. The air reservoir 140 may include a regulator 146 that may be fluidly connectable to an air source 158 by means of a fitting 150. The air source 158 may provide pressurized air to the air reservoir 140 at any pressure level such as at a pressure level of 150 psi. The regulator 146 may regulate the pressure down to a relatively lower pressure level such as 80 psi or to any other suitable pressure level.

The regulator 146 may further include an auxiliary fitting 148 which may extend outwardly from the regulator 146 to facilitate connection of air tools or other devices while the air source 158 is connected to the air reservoir 140. The air reservoir 140 may include a check valve 170 (not shown) to prevent escape of pressurized air in a direction back toward the air source 158. An end of the air reservoir 140 opposite the regulator 146 may include a reservoir nipple 152 to which a reservoir hose 154 may be coupled. The reservoir hose 154 may be connected to the control switch 164 for regulating operation of the actuating mechanism 54 as will be described in greater detail below. The air reservoir 140 may provide a source of pressurized air to the air cylinder upon loss of air pressure from the air source 158. The air reservoir 140 may further include a reservoir hook 156 as illustrated in FIG. 1 to facilitate mounting of the air reservoir 140. The air reservoir 140 may be formed of any suitable material including any metallic or non-metallic material. For example, the air reservoir 140 may be formed of polyethylene or any other suitable high-impact or durable polymeric material.

Referring still to FIG. 2, the reservoir hose 154 may connect the air reservoir 140 to a valve 170 in the control switch 164. The control switch 164 may, in turn, be fluidly coupled to the air cylinder 56 mounted within the main housing 12 of the actuating mechanism 54 by means of the air cylinder hoses 30. The reservoir hose 154 and air cylinder hoses 30 may be provided in any length and may be formed of any suitable material and preferably of a flexible material to facilitate routing and stowing of the reservoir and air cylinder hoses 30. For example, the reservoir hose 154 and air cylinder hoses 30 may be formed of polymeric material such as petroleum-resistant silicone tubing.

Referring now to FIGS. 3-6, shown is the actuating mechanism 54. FIG. 3 illustrates the actuating mechanism 54 being coupled to the chuck assembly 98 for rotating the chuck assembly 98 into an "Off" position 190, "a Neutral" position and an "On" position 194. For example, FIG. 4 illustrates the chuck assembly 98 rotated into the "Off", "Neutral" and "On" positions 190, 192, 194. As indicated above, the "Off", "Neutral" and "On" positions 190, 192, 194 may correlate to the "Off", "On" and "Start" positions of an ignition switch 260 of a motor vehicle 250. The actuating mechanism 54 may facilitate rotation of the chuck assembly 98 in a clockwise and/or counterclockwise direction in order to move the chuck assembly 98 between the "Off", "Neutral" and "On" positions 190, 192, 194.

Referring still to FIG. 3, the rotary actuator 10 may include a main housing 12 which may be comprised of upper and lower housing portions 14, 16. The main housing 12 may be formed of any suitable material such as any suitable metallic or non-metallic material. For example, the main housing 12 may be formed of a polyethylene and/or nylon material or any other material which may be resistant to chemicals such as petroleum products. Furthermore, the main housing 12 is preferably formed of a material having high durability and which is preferably impact-resistant.

The main housing 12 may include an opposing pair of housing ends 18. As was earlier indicated, the universal joint 230 may be mounted to one of the housing ends 18 such as the end opposite the chuck assembly 98. The main housing 12 may include a grip portion 20 on one of the upper and/or lower housing portions 14, 16 to facilitate grasping of the main housing 12 by a technician 262 as may be required during positioning of the rotary actuator 10. A pair of housing nipples 24 may extend outwardly from the lower housing portion 16 for fluid connection of the air cylinder hoses 30 to the air cylinder 56 contained within the main housing 12. Although shown as right angle housing nipples 24, the housing nipples 24 may be provided in any configuration such as in a straight configuration. Barb clamps 26 may be provided with the housing nipples 24 in order to secure the air cylinder hoses 30 to the housing nipples 24.

Figure 7:
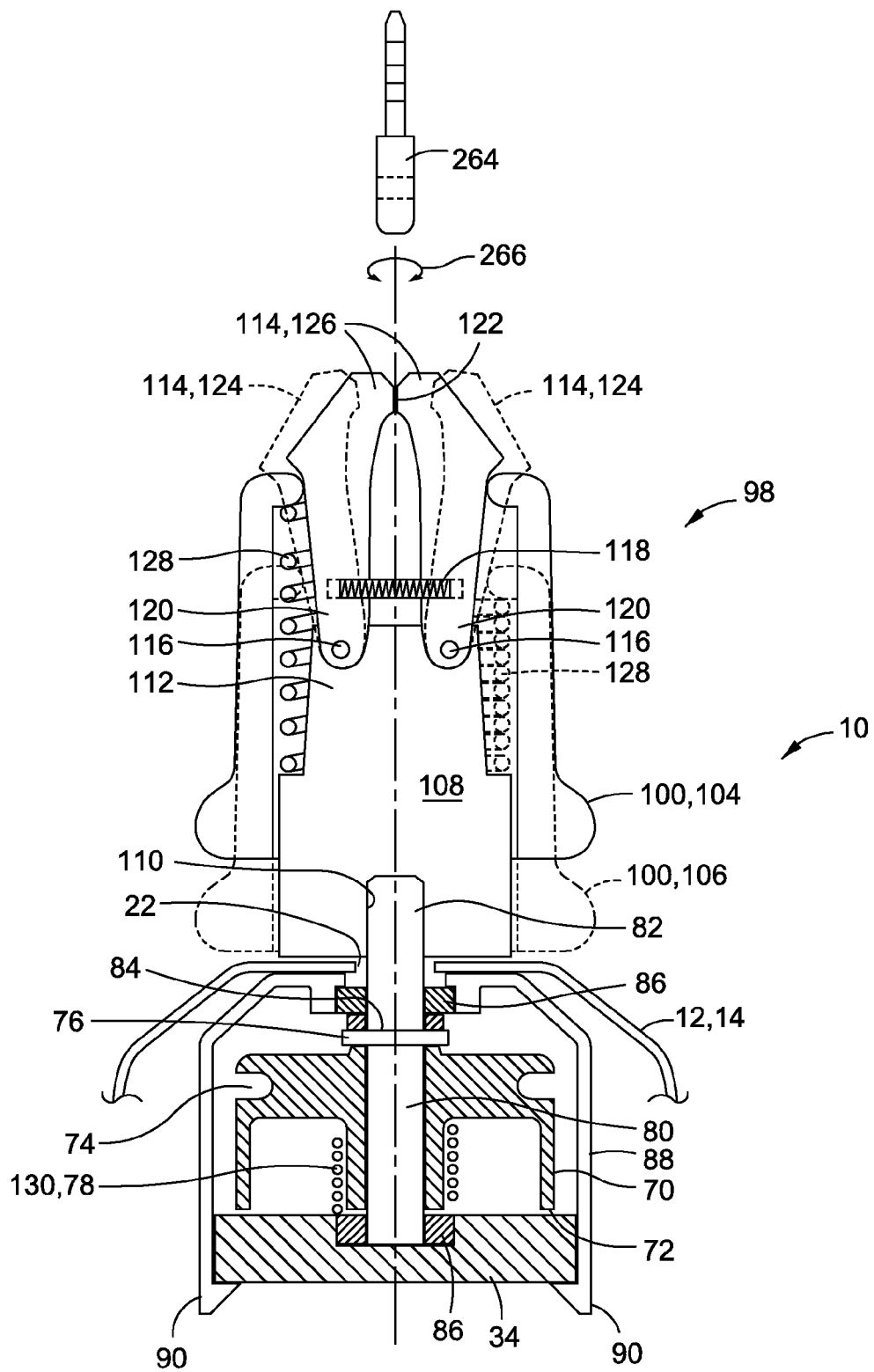
FIG. 7 is a sectional illustration of the chuck assembly and main hub and illustrating the chuck housing being movable between a deployed position and a retracted position in correspondence with the pivotable movement of a pair of jaws of the chuck assembly between open and closed positions.

The rotary actuator 10 may include the chuck assembly 98 which may be configured to engage a key 264 or other object. The key 264 may be received within the key ignition switch 260 of the motor vehicle 250 as illustrated in FIG. 1. The chuck assembly 98 may include a pair of jaws 114 which may be pivotable between open and closed positions 124, 126 in order to clamp or engage the key 264 or other object. As can be seen in FIG. 7, the chuck housing 100 may include a chuck housing opening 102 through which a portion of the jaws 114 may extend. The chuck housing 100 may be axially movable between a retracted position 104 and a deployed position 106 as best seen in FIG. 7 to facilitate movement of the jaws 114 between the open and closed positions 124, 126 such that the key 264 or other object may be clamped between the jaws 114.

The chuck assembly 98 may further include a chuck body 108 to which the jaws 114 may be mounted at pivoting ends 120 of the jaws 114. As will be described in greater detail below, the jaws 114 may include a jaw spring 118 for biasing the jaws 114 toward the open position 124. As indicated above, the chuck housing 100 is movable from the deployed position 106 to the refracted position 104 as illustrated in FIG. 7. Upon movement of the chuck housing 100 from the deployed position 106 to the retracted position 104, the jaw spring 118 forces the jaws 114 to pivot toward the open position 124 such that the key 264 may be inserted between the gap or opening between the clamping ends 122 of the jaws 114. The chuck housing 100 may then be moved back toward the deployed position 106 forcing the jaws 114 toward the closed position 126 and clamping the key 264 between the clamping ends of the jaws 114.

Referring to FIGS. 4-6, shown is the rotary actuator 10 having a main support frame 34 to which the air cylinder 56 may be mounted by means of a pair of cradle fittings 36. The cradle fittings 36 may be generally U-shaped and may be configured to receive a corresponding pair of cylinder fittings 62 located on opposing ends of the air cylinder 56 as best seen in FIG. 6. For example, the cylinder fittings 62 may include flats for engaging the U-shaped cradle fittings 36 of the main support frame 34. However, the main support frame 34 may include any suitable engagement feature for fastening or securing the air cylinder 56.

The air cylinder 56 may be connected to the source of pressurized air by means of the housing nipples 24 which may be threadably engaged to the air cylinder 56. Pressurized air may be delivered to one of opposing ends of the air cylinder 56 by manipulating the control switch 164. By activating the switch element 188 of the control switch 164 between the "Off", "Neutral" and "On" positions 190, 192, 194, pressurized air is delivered to one of the opposing ends of the air cylinder 56 to cause the cylinder rods 58 to move linearly relative to the air cylinder 56 as described in greater detail below.

Referring still to FIGS. 4-6, the cylinder rods 58 can be seen extending outwardly from opposing ends of the air cylinder 56. Each one of the cylinder rods 58 may include a rod end 60 clevis which may include a bore for receiving a cable end 50 of the cable 48. The cable 48 may comprise a single length of cable 48 connected to the rod ends 60. The cable 48 may extend around the ends of the main support frame 34 and may be connected to the rod ends 60 on the opposite side of the air cylinder 56. The main support frame 34 may include an end pulley 38 on each of opposing ends of the main support frame 34 for guiding the cable 48. Each one of the end pulleys 38 may be mounted to the end of the main support frame 34 by means of an end pulley pin 40 extending through a pin bore 42 formed in each end of the main support frame 34 as best seen in FIG. 6.

The main support frame 34 may further include a pair of lateral pulleys 44 which may be mounted on spacers 52. Each one of the lateral pulleys 44 may be mounted to a spacer 52 by means of a lateral pulley pin 46 extending through the lateral pulley 44 and spacer 52 and threadably engaging the main support frame 34. However, the lateral pulleys 44 and end pulleys 38 may be mounted in any suitable manner and are not limited to mounting by means of the end pulley pins 40 or lateral pulley pins 46. Referring briefly to FIG. 4, the cable 48 can be seen as being routed around a main hub 70 by means of the lateral pulleys 44. The main hub 70 may include a cable groove 74 as best seen in FIG. 6. The cable 48 may be engaged to the cable groove 74 such that linear movement of the cable 48 results in rotational movement of the main hub 70 and causing rotational movement 266 of the chuck assembly 98.

Referring to FIGS. 6-7, the main hub 70 may be fixedly coupled to a main shaft 80 for rotation thereof relative to the main support frame 34. The main hub 70 may include a collar through which a hub pin 76 may be extended to fixedly couple the main hub 70 to the main shaft 80. The hub pin 76 may extend into a shaft bore 84 formed transversely through the main shaft 80 as best seen in FIG. 7. The main shaft 80 may be supported by one or more bearings 86. For example, FIG. 7 illustrates a bearing 86 located on a lower side of the main hub 70 and which may be mounted into the main support frame 34. In addition, a bearing 86 may be located on an upper side of the main hub 70. The bearing 86 on the upper side of the main hub 70 may be mounted to the bearing cover 88 which may extend over the main hub 70 to fix the main hub 70 and main shaft 80 to the main support frame 34. The bearing cover 88 may be engaged to the main support frame 34 by means of one or more fingers 90 as illustrated in FIG. 6 which may extend over the main hub 70. The fingers 90 may include hooked ends for engaging an underside of the main support frame 34.

It should be noted that the bearing cover 88 may be configured in a variety of alternative arrangements and is not limited to the specific arrangement illustrated in FIGS. 6 and 7. Even further, the main shaft 80 may be supported by any suitable means and is not limited to being supported by the pair of bearings 86 mounted to the main support frame 34 and bearing cover 88. Referring still to FIGS. 6-7, the bearing 86 on the upper side of the main hub 70 may be journaled or press fit into a flange 112 formed on an underside of the bearing cover 88. As indicated above, the bearing cover 88 may be fixed against rotation relative to the main support frame 34 by means of the fingers 90 which may extend around the main support frame 34. The bearing cover 88 may optionally be engaged to an anti-rotation feature (not shown) which may be formed in the upper housing portion 14 of the main housing 12.

Referring to FIG. 7, the main hub 70 may include a generally hollow interior defined by a lower edge 72 of the main hub 70 and an interior sleeve of the main hub 70. A chuck biasing mechanism 130 such as a hub spring 78 may be disposed around the main hub 70 as illustrated in FIG. 7. The hub spring 78 may be formed as a torsion spring which may be engaged to the main support frame 34 on one end of the hub spring 78 and to the main hub 70 on the opposite end of the hub spring 78. The hub spring 78 may bias the main hub 70 and the chuck assembly 98 toward the "Neutral" position 192 as illustrated in FIG. 4. In this regard, rotation of the main hub 70 and the chuck assembly 98 to the "On" position 194 and/or "Off" position 190 causes the hub spring 78 to bias or urge the chuck assembly 98 back toward the "Neutral" position 192.

Referring briefly to FIGS. 5-6, a pair of cylinder springs 64 may be mounted over the cylinder rods 58 extending from opposing ends of the air cylinder 56. The cylinder springs 64 may function as the chuck biasing mechanism 130 and may be coaxially mounted around the pair of cylinder rods 58. The cylinder springs 64 may further facilitate the biasing or urging of the main hub 70 and/or the chuck assembly 98 from the "Off" position 190 or "On" position 194 toward the "Neutral" position 192.

Referring to FIGS. 6 and 7, the chuck assembly 98 may include a chuck body 108 which may be engageble to a splined end 82 of the main shaft 80 as best seen in FIG. 6. The main shaft 80 may extend upwardly through the bearing cover 88 and main housing 12 such that the splined end 82 protrudes out of the main housing 12. The chuck body 108 may be non-rotatably mounted to the main shaft 80. For example, the chuck body 108 may include a chuck body bore 110 formed complementary to splined end 82 of the main shaft 80.

The chuck body 108 and main shaft 80 may be formed of magnetically attractive or magnetizable material such that the chuck body 108 may be magnetically coupled to the main shaft 80. In this manner, the chuck body 108 may be removed from the main shaft 80 and angularly adjusted and re-installed on the main shaft 80 in order to align the jaws 114 with the angular orientation of the ignition switch 260. The chuck body 108 may be mounted to the main shaft 80 by any suitable manner and is not limited to being engaged to the splined end 80 of the main shaft 82 by magnetic attachment. Furthermore, the chuck body 108 is not limited to including a chuck body bore 110 for mounting on the splined end 82 of the main shaft 80 as illustrated in FIGS. 6 and 7.

The chuck body 108 may include one or more flanges 112 extending upwardly therefrom and to which the pivoting ends 120 of the jaws 114 may be mounted as best seen in FIG. 7. For example, the flanges 112 of the chuck body 108 may form a clevis-type fitting into which the pivoting ends 120 of the jaws 114 may be inserted. The pivoting ends 120 of the jaws 114 may be mounted to the chuck body 108 by means of a pair of jaw pins 116 extending through a corresponding pair of bores formed in each one of the jaws 114 and in the flanges 112.

As shown in FIG. 7, the jaws 114 may extend upwardly through the chuck housing opening 102 formed in the chuck housing 100. The clamping ends 122 of the jaws 114 may protrude from the chuck housing opening 102. As was earlier indicated, the chuck housing 100 is movable between a retracted position 104 and a deployed position 106. The jaws 114 may have an exterior profile or size that is larger than the chuck housing opening 102 in order to retain the chuck housing 100 to the chuck body 108. For example, each one of the jaws 114 may include an outwardly extending lip formed on an exterior side of the jaws 114. The chuck housing opening 102 is preferably smaller than the width of the jaws 114 at the clamping end 122 to retain the chuck housing 100 with the chuck body 108.

The jaws 114 may include at least one jaw spring 118 which may be inserted between the jaws 114 such as at the pivoting end 120 thereof. For example, each one of the jaws 114 may include a bore for receiving the end of the jaw spring 118. The jaw spring 118 facilitates the biasing or urging of the jaws 114 away from one another toward the open position 124 as illustrated in phantom in FIG. 7. The chuck housing opening 102 limits the extent to which the jaws 114 may be pivoted into the open position 124. Due to the configuration of the jaws 114 relative to the chuck housing opening 102, movement of the chuck housing 100 from the deployed position 106 to the retracted position 104 results in pivoting of the jaws 114 toward the open position 124. When the jaws 114 are in the open position 124, an object such as a key 264 may be inserted within the gap between the jaws 114. Movement of the chuck housing 100 back toward the deployed position 106 forces the jaws 114 toward the closed position 126 as the chuck housing opening 102 slidably engages the outer sides of the jaws 114. In this manner, the clamping ends 122 of the jaws 114 are forced back towards the closed position 126 thereby clamping the key 264 between the jaws 114.

Referring still to FIG. 7, the chuck housing 100 may include a chuck spring 128 which may be mounted within the chuck housing 100 and which may extend between the inside surface of the chuck housing opening 102 and the chuck body 108. The chuck spring 128 may be coaxially disposed within the chuck housing 100 and may be engaged between the chuck housing opening 102 and the chuck body 108. The chuck spring 128 urges the chuck housing 100 toward the retracted position 104 as illustrated in FIG. 7 which causes the chuck housing opening 102 to engage the outer surfaces of the jaws 114 and force the clamping ends 122 of the jaws 114 towards the closed position. The chuck spring 128 maintains the chuck housing 100 in the retracted position 104 to engage and clamp an object such as the key 264 illustrated in FIG. 7.

The chuck housing 100 may include an interior geometry that is complementary to the exterior surface of the chuck body 108 to facilitate axial sliding motion of the chuck housing 100 relative to the chuck body 108. For example, the chuck housing 100 may include a cylindrical interior surface which may be formed complementary to a cylindrical exterior surface of the chuck body 108. However, the chuck body 108 may be formed in any configuration and is not limited to a cylindrical shape.

Figure 8:
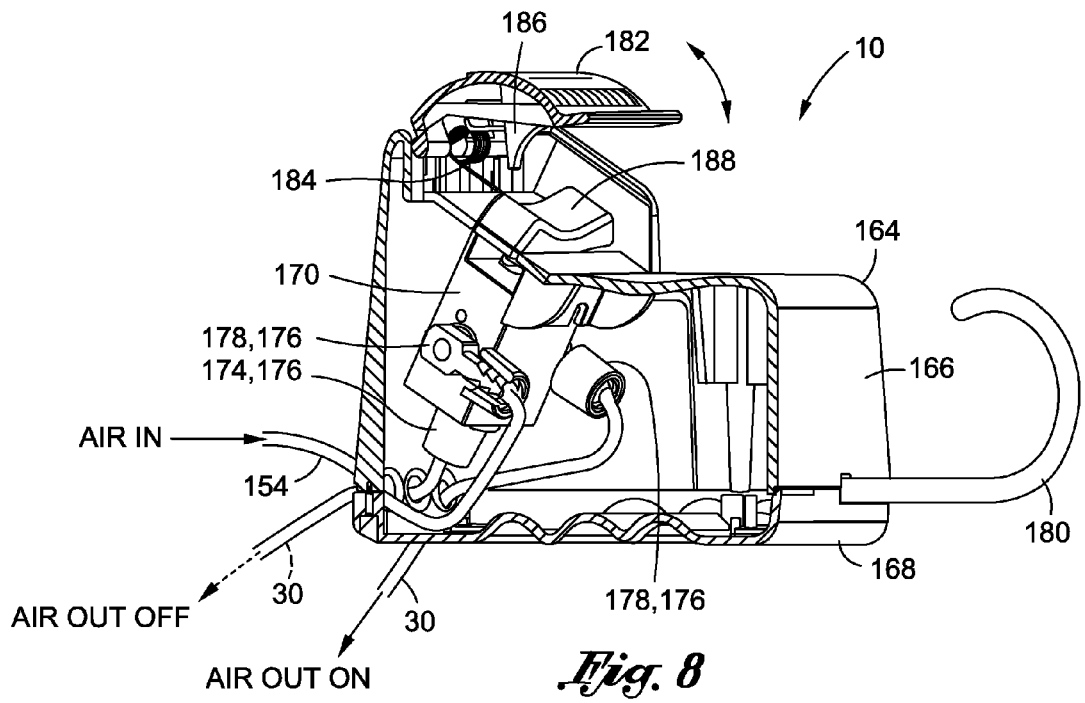
FIG. 8 is a perspective sectional illustration of a control switch as may be coupled to the actuating mechanism.
Figure 9:
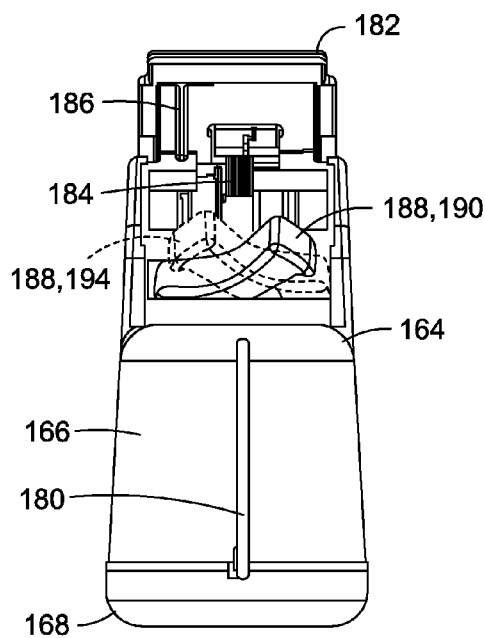
FIG. 9 is an end view of the control switch.
Figure 10:
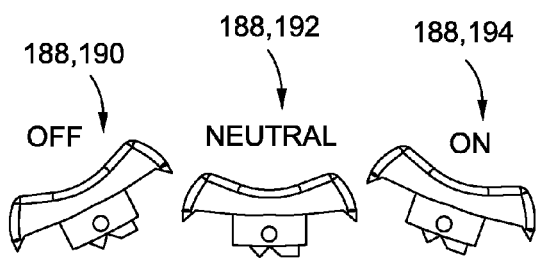
FIG. 10 is a schematic illustration of a switch element of the control switch and which may be movable between "Off", "Neutral", and "On" positions.

Referring to FIGS. 8-10, shown is the control switch 164 which may be communicatively coupled to the actuating mechanism 54 such as by means of the air cylinder hoses 30. As was indicated above, the control switch 164 may facilitate control of the actuating mechanism 54 in order to rotate the chuck assembly 98 into at least one of the "Off", "Neutral" and "On" positions 190, 192, 194. As can be seen in FIG. 8, the control switch 164 may include a switch housing comprising an upper switch housing portion 166 and a lower switch housing portion 168. The switch housing may include a grip portion 20 formed on one of the upper and lower switch housing portions 166, 168 to facilitate handling of the control switch 164. The control switch 164 may further include a switch hook 180 and/or a magnet (not shown) for supporting or suspending the control switch 164 during use.

The control switch 164 may contain a valve 170 at which the air cylinder hoses 30 and reservoir hose 154 terminate. The valve 170 may include a pair of right angle valve nipples 178 for connecting the air cylinder hoses 30 to the valve 170. A pair of hose barb clamps 176 may secure the ends of the air cylinder hoses 30 to the valve nipples 178. Likewise, the reservoir hose 154 may be connected to the valve 170 by means of a valve nipple 174 which may be extended outwardly from the bottom of the valve 170 and which may be secured to the reservoir hose 154 by means of a hose barb clamp 176. However, as was earlier indicated, the air cylinder hoses 30 and reservoir hose 154 may be coupled to the valve 170 by any suitable means and are not limited to the specific arrangement illustrated in FIG. 8.

The valve 170 may include a toggling switch element 188 for controlling the distribution of air from the reservoir hose 154 to one of the air cylinder hoses 30. The switch element 188 may be provided in any suitable arrangement such as a rocker-type switch element 188 as best seen in FIGS. 9 and 10 wherein the rocker-type switch element 188 may be toggled between the "Off", "Neutral" and "On" positions 190, 192, 194. Such positions may correspond to the "Off", "Neutral" and "On" positions 190, 192, 194 of the chuck assembly 98 as best seen in FIG. 4. The switch element 188 may be spring-loaded or biased from the "On" position 194 towards the "Neutral" position 192 in order to simulate the spring-loaded configuration of an ignition switch 260 of a motor vehicle 250.

The valve 170 may be configured such that with the switch element 188 in the "Neutral" position 192, pressurized air from the reservoir hose 154 is blocked from flowing into the air cylinder hoses 30. Toggling of the switch element 188 to the "Off" position 190 causes the valve 170 to route pressurized air from the reservoir hose 154 into one of the air cylinder hoses 30 and causing movement of the air cylinder 56 in one direction. Likewise, toggling of the switch element 188 from the "Neutral" position 192 to the "On" position 194 causes a routing of pressurized air from the reservoir hose 154 to the other one of the air cylinder hoses 30 causing movement of the air cylinder 56 in an opposite direction. As can be seen in FIG. 4-6, linear movement of the cylinder rods 58 causes the cable 48 to move linearly which may cause rotation 266 of the main hub 70 and the chuck assembly 98.

Referring still to FIGS. 8-10, the control switch 164 may include a safety mechanism comprising a switch cover 182 which may be pivotably engaged to the switch housing by means of a cover spring 184 (e.g., torsion spring) or other suitable biasing mechanism. The cover spring 184 may bias the switch cover 182 toward the closed position. As can be seen in FIGS. 8 and 9, the switch cover 182 may optionally include a protrusion 186 extending downwardly from an interior of the switch cover 182. The protrusion 186 may be generally aligned with the left hand side of the switch element 188 or aligned with the "Off" position of the switch element 188 as illustrated in FIG. 9. Depressing the switch cover 182 to a sufficient extent may cause the protrusion 186 to move the switch element 188 into the "Off" position 190 as illustrated in FIGS. 9 and 10. In this regard, the switch cover 182 may provide a means for shutting off the ignition switch 260 and deactivating the electrical systems of the motor vehicle 250 by depressing a top portion of the switch cover 182 such that the protrusion 186 may depress the switch element 188 to a sufficient extent to move the switch element 188 to the "Off" position 190.

The operation of the rotary actuator 10 will now be described with reference to FIGS. 1-10. As indicated above, the rotary actuator 10 may be remotely operated in order to control the rotation of a rotary switch such as an ignition switch 260 of a motor vehicle 250. During installation of the rotary actuator 10, the chuck assembly 98 may be aligned with the ignition switch 260 of the motor vehicle 250 as illustrated in FIG. 1 by orienting the jaws 114 of the chuck assembly 98 to correspond to the orientation of the ignition switch 260 in the "Off" position 190. The chuck assembly 98 may be adjusted in any angular relation to the main housing 12 by removing the chuck body 108 from the main shaft 80 as illustrated in FIG. 7.

As was earlier indicated, the chuck body 108 may be magnetically coupled to the main shaft 80 such that the chuck body 108 may be removed from the splined end 82 of the main shaft 80, re-oriented into alignment with the rotating limits of a switch to be rotated, and then re-installed back onto the main shaft 80. The clamp mechanism 200 may then be attached to a suitable mounting surface 258 such as the windshield 256 illustrated in FIG. 1. The suction cup 202 may be clamped by means of rotating the cup adjustment nut 210 in order to apply vacuum pressure between the faying surface 220 of the suction cup 202 and the windshield 256. Alternatively, the clamp mechanism 200 may comprise any suitable configuration for clamping the rotary actuator 10 to a fixed or stationary feature 268 in any one of the configurations described above.

Following attachment of the clamp mechanism 200 to a stationary feature 268, the swivel rod 216, if included, may be positioned relative to the clamp mechanism 200 in the desired orientation followed by locking the position of the swivel rod 216 by rotation the swivel lock nut 212 as best illustrated in FIG. 2A-2B. The universal joint 230 may be positioned at a desired location along the length of the swivel rod 216 such that the chuck assembly 98 is aligned with the ignition switch 260 and oriented complementary to the rotational direction of the ignition switch 260. In this regard, the chuck assembly 98 may define a chuck centerline as best seen in FIG. 3 and which is preferably aligned with a rotational axis of the ignition switch 260. Upon orienting the swivel rod 216 and actuating mechanism 54 by adjusting the universal joint 230, the cam lever 236 may be moved into a locked position in order to lock the first and second swivel clamp portions 232, 234 together to lock the swivel rod 216 and main housing 12 of the actuating mechanism 54 in position.

The rotary actuator 10 may be connected to a suitable pressurized air source 158. As illustrated in FIG. 2, shop air may be connected to the fitting 150 extending outwardly from the regulator 146 mounted on the air reservoir 140. The regulator 146 may regulate the pressure of the air source down to a suitable pressure level. The switch cover 182 may be moved to the open position 124 to provide access to the switch element 188. The switch element 188 may be initially moved into an "Off" position 190 to correspond to an "Off" position 190 of the ignition switch 260. The switch element 188 may be then moved to the "Neutral" position 192 which may cause the chuck assembly 98 to rotate toward the "Neutral" position 192 as illustrated in FIG. 4. Alternatively, the ignition switch 260 may be moved to the "Neutral" position 192 (i.e., the "On" position 194 of a conventional ignition switch 260 of a motor vehicle) and the switch element 188 may be initially positioned in the "Neutral" position 192 on the control switch 164.

The switch element 188 may be toggled between the "Neutral" position 192 and one of the "Off" and "On" positions 190, 194 during diagnostic testing. Toggling the switch element 188 from the "Neutral" position 192 to the "Off" or "On" positions 190, 194 causes pressurized air from the air reservoir 140 to be routed to one of the air cylinder hoses 30 as illustrated in FIG. 3. For example, with the switch element 188 in the "Neutral" position 192 and the chuck assembly 98 in the "Neutral" position 192, moving the switch element 188 to the "Off" position 190 as illustrated in FIG. 10 causes pressurized air to be delivered to one side of the air cylinder 56 causing movement of the cylinder rods 58 in one direction. The cable 48 is then caused to move linearly which results in rotation 266 of the main hub 70 and chuck assembly 98.

The rotary actuator 10 may include one or more chuck biasing mechanisms 130. The chuck biasing mechanisms 130 may comprise the pair of cylinder springs 64 mounted on opposing sides of the air cylinder 56 as shown in FIGS. 5-6 and/or as the hub spring 78 (i.e., torsion spring) mounted within the main hub 70 as shown in FIG. 7. Each one of the biasing mechanisms may bias the chuck assembly 98 from the "On" position 194 back toward the "Neutral" position 192. In this regard, such biasing movement is initiated by toggling the switch element 188 from the "Neutral" position 192 to the "On" position 194 which causes movement of the cylinder rods 58 and cable 48 in an opposite direction with consequent rotation 266 of the main hub 70 and chuck assembly 98 toward the "On" position 194. The switch element 188 may be biased or spring loaded in order to urge the switch element 188 away from the "On" position 194 and toward the "Neutral" position 192. Likewise, the arrangement of the actuating mechanism 54 and chuck biasing mechanisms 130 causes the chuck assembly 98 to be urged back toward the "Neutral" position 192.

In this manner, the rotary actuator 10 may minimize the amount of time that the chuck assembly 98 is in the "On" position 194 which may otherwise cause the ignition switch 260 to be maintained in the "Start" position for an extended period of time which may be undesirable. Further in this regard, the air cylinder 56 may prevent over-torquing of the ignition switch 260. For example, there may be a time lag from the time that the switch element 188 is toggled to the "On" position 194 to the time the chuck assembly 98 is rotated into the "On" position 194. In this manner, the rotary actuator 10 may prevent over-rotation or over-torquing of the rotary switch.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A remotely operable rotary actuator, comprising:
a rotatable chuck assembly, including:
   a chuck housing having an opening and being axially movable between a retracted position and a deployed position; and
   a pair of jaws extending through the housing opening and being pivotable relative to one another between open and closed positions in correspondence to the refracted and deployed positions of the chuck housing; and
an actuating mechanism coupled to the chuck assembly for rotating the chuck assembly between an "Off" position, a "Neutral" position and an "On" position; and
a chuck biasing mechanism for biasing the chuck assembly toward the "Neutral" position.

2. The rotary actuator of claim 1 further comprising:
a control switch communicatively coupled to the actuating mechanism for actuating the actuating mechanism.

3. The rotary actuator of claim 2 wherein:
the control switch is biased toward the "Neutral" position.

4. The rotary actuator of claim 2 wherein:
the control switch and actuating mechanism are configured such that a time delay occurs between actuation of the control switch and rotation of the chuck assembly.

5. The rotary actuator of claim 2 wherein:
the control switch includes a switch cover being movable between open and closed positions;
the switch cover being configured to move a switch element to the off position when the switch cover is moved toward the closed position.

6. The rotary actuator of claim 1 further comprising:
a chuck spring coupled to the chuck housing for biasing the chuck housing toward the retracted position such that the jaws are urged toward the closed position.

7. The rotary actuator of claim 1 further comprising:
a universal joint for coupling the actuating mechanism to a clamping mechanism.

8. The rotary actuator of claim 1 wherein:
the actuating mechanism is configured as one of a hydraulic actuator, an air cylinder, and an electromechanical actuator.

9. The e rotary actuator of claim 8 further comprising:
an air source coupled to an air cylinder configured as the actuating mechanism; and
an air reservoir fluidly coupled between the air cylinder and the air source and storing pressurized air for actuating the air cylinder.

10. The rotary actuator of claim 1 wherein:
the chuck biasing mechanism comprises at least one cylinder spring coupled to an air cylinder for biasing the chuck assembly toward the "Neutral" position.

11. The rotary actuator of claim 1 further comprising:
a clamping mechanism having a suction cup for mounting the actuating mechanism to a mounting surface;
the suction cup including a release nub positioned on a faying surface of the suction cup for facilitating release of the suction between the faying surface and the mounting surface.

12. A remotely operable rotary actuator, comprising:
a rotatable chuck assembly, including:
   a chuck housing having an opening and being axially movable between a retracted position and a deployed position;
   a pair of jaws extending through the housing opening and being pivotable relative to one another between open and closed positions in correspondence to the retracted and deployed positions of the chuck housing, the jaws including a jaw spring for biasing the jaws away from one another; and
   a chuck spring coupled to the chuck housing for biasing the chuck housing toward the retracted position such that the jaws are urged toward the closed position;
an actuating mechanism coupled to the chuck assembly for rotating the chuck assembly between an "Off" position, a "Neutral" position and an "On" position, the actuating mechanism including a chuck biasing mechanism for biasing the chuck assembly away from the "On" position and toward the "Neutral" position; and
a control switch communicatively coupled to the actuating mechanism for actuating the actuating mechanism in a manner to cause the chuck assembly to rotate between the "Off", "Neutral" and "On" positions.

13. The rotary actuator of claim 12 wherein:
the control switch and actuating mechanism are configured such that a time delay occurs between actuation of the control switch and rotation of the chuck assembly.

14. The rotary actuator of claim 12 wherein:
the actuating mechanism is configured as one of a hydraulic actuator, an air cylinder, and an electromechanical actuator.

15. The rotary actuator of claim 14 further comprising:
an air reservoir fluidly coupled between the air cylinder and an air source, the air reservoir storing pressurized air for actuating the air cylinder.

16. The rotary actuator of claim 12 wherein:
the chuck biasing mechanism comprises at least one cylinder spring coupled to an air cylinder for biasing the chuck assembly toward the "Neutral" position.

17. The rotary actuator of claim 12 further comprising:
a clamping mechanism for mounting the actuating mechanism to a stationary feature.

18. The rotary actuator of claim 17 wherein:
the stationary feature includes a mounting surface;

the clamping mechanism including a suction cup for mounting the actuating mechanism to the mounting surface;

the suction cup including a release nub positioned on a faying surface of the suction cup for facilitating release of suction between the faying surface and the mounting surface.

19. The rotary actuator of claim 12 further comprising:
the control switch is biased toward the "Neutral" position.

\* \* \* \* \*